(12) United States Patent
Li

(10) Patent No.: US 8,067,877 B2
(45) Date of Patent: Nov. 29, 2011

(54) ANTI-EMI ULTRASONIC TRANSDUCER

(76) Inventor: Shih-Hsiung Li, Taipei (TW)

( * ) Notice: Subject to any disclaimer, the term of this patent is extended or adjusted under 35 U.S.C. 154(b) by 78 days.

(21) Appl. No.: 12/617,607

(22) Filed: Nov. 12, 2009

(65) Prior Publication Data

US 2010/0231093 A1 Sep. 16, 2010

(30) Foreign Application Priority Data

Mar. 10, 2009 (TW) .............................. 98107603 A

(51) Int. Cl.
H01L 41/04 (2006.01)
H01L 41/053 (2006.01)
(52) U.S. Cl. ........................................ 310/334; 310/348
(58) Field of Classification Search .................. 310/322, 310/334, 335, 348
See application file for complete search history.

(56) References Cited

U.S. PATENT DOCUMENTS

| | | | | |
|---|---|---|---|---|
| 2,967,957 A | * | 1/1961 | Massa | 310/324 |
| 4,190,783 A | * | 2/1980 | Massa | 310/324 |
| 4,368,400 A | * | 1/1983 | Taniguchi et al. | 310/322 |
| 4,755,975 A | * | 7/1988 | Ito et al. | 367/140 |
| 5,987,992 A | | 11/1999 | Watanabe | |
| 6,897,601 B2 | * | 5/2005 | Birth et al. | 310/334 |

FOREIGN PATENT DOCUMENTS

| | | |
|---|---|---|
| DE | 4215271 A1 | 11/1993 |
| DE | 29611678 U1 | 9/1997 |
| DE | 10137424 A1 | 4/2003 |
| JP | 62294921 A | 12/1987 |
| JP | 05184572 A | 7/1993 |
| JP | 8237796 A | 9/1996 |
| WO | WO 2009/044640 | 4/2009 |

OTHER PUBLICATIONS

British Combined Search and Examination Report mailed Jul. 29, 2009.

* cited by examiner

*Primary Examiner* — Derek Rosenau
(74) *Attorney, Agent, or Firm* — Herhskovitz & Associates, LLC; Abraham Hershkovitz

(57) ABSTRACT

An anti-EMI ultrasonic transducer has a conductive casing, a piezoelectric ceramic board having an opening, a conductive shelter, a first and second wires and an encapsulation. A first electrode face of the piezoelectric ceramic board faces to the opening and a second electrode face is mounted inside the conductive casing. The conductive shelter is mounted inside the conductive casing or covered to the opening, so the piezoelectric ceramic board is encapsulated in the conductive shelter and the conductive casing. Since the second signal wire is connected to the conductive shelter mounted inside the conductive casing, the conductive shelter and the conductive casing and the second electrode face of the piezoelectric ceramic board are commonly electronically connected to a voltage signal transmitted by the second signal wire. Therefore, the conductive shelter and the conductive casing are constituted to an EMI shelter for the piezoelectric ceramic board to resist external EMI signal.

16 Claims, 11 Drawing Sheets

ANTI-EMI ULTRASONIC TRANSDUCER

BACKGROUND OF THE INVENTION

1. Field of the Invention

The present invention relates to an ultrasonic transducer, and more particularly to an anti-EMI ultrasonic transducer.

2. Description of Related Art

An ultrasonic transducer is used in many apparatus, such as a reversing vehicle sensor. The ultrasonic transducer uses piezoelectric ceramic board, so the piezoelectric ceramic board starts to vibrate to generate the ultrasonic wave in the air when a controller of the reversing vehicle sensor outputs an alternating voltage signal with 40 HKz to the piezoelectric ceramic board. When the ultrasonic wave is reflected by an obstacle outside the vehicle, the piezoelectric ceramic board generates a detecting voltage after receiving the reflected ultrasonic wave. Therefore, the controller of the reversing vehicle sensor calculates a distance between the vehicle and the obstacle according to the current from the piezoelectric ceramic board. If the distance is determined in an unsafe range, the controller alarms the vehicle driver.

Since the reflected ultrasonic wave is weaker than the ultrasonic wave generated by the piezoelectric ceramic board, the piezoelectric ceramic board generates the small detecting voltage (about 2 mV to 5 mV). In fact, the controller does not calculate the exact distance according to the small detecting voltage, so a signal amplifier is required. In general, the signal amplifier having 500-1000 gain can be used in the reversing vehicle sensor. The signal amplifier is electronically connected between the piezoelectric ceramic board and the controller, the small detecting voltage is amplified and then output to the controller. However, the signal amplifier not only amplifies the detecting voltage, but also amplifier the noise. The noise may be generated by the piezoelectric ceramic board and wires between the piezoelectric ceramic board and the signal amplifier. Therefore, the controller determines the distance between the vehicle and the obstacle according the amplified detecting voltage with the noise, the distance is easily inaccurate.

With reference to FIGS. 10 and 11, a conventional ultrasonic transducer has a metal casing (60), a piezoelectric ceramic board (62), multiple signal wires (63) and an encapsulation (65). The metal casing (60) has an inside face, inside wall, a metal ring (64) and an opening (61). The metal ring (64) is mounted the inside wall of the metal casing (60). The piezoelectric ceramic board (62) is mounted inside the metal casing (60) and has two opposite first and second electrode faces. The first electrode face is mounted on the inside face of the metal casing (60) and the second electrode face faces to the opening (61). The signal wires (63) has a first signal wire (632) and a second signal wire (631). One end of the first signal wire (632) is soldered to a metal ring (64), so the first signal wire (632) is electronically connected to the metal casing (60) and the first electrode face of the piezoelectric ceramic board (62) through the metal ring (64). One end of the second wire is soldered to the second electrode face of the piezoelectric ceramic board (62). The encapsulation (65) is formed in the metal casing (60) to seal the metal ring (64), the piezoelectric ceramic board (62) and parts of the first and second signal wires (632)(631).

Based on the foregoing description, since the piezoelectric ceramic board (62) is only sealed in the encapsulation (65) and the encapsulation (65) is an electric insulation material, external EMI signals (66) enters inside the metal casing (60) from the opening (61) easily. The EMI signals (66) further interfere the piezoelectric ceramic board (62) to generate the detecting voltage. Therefore, the detecting voltage generated by the piezoelectric ceramic board can have the EMI noise. Therefore, the detecting voltage with EMI noise is amplified by the signal amplifier and the controller determines inaccurate distance and erroneous alarm.

To overcome the shortcomings, the present invention provides an anti-EMI ultrasonic transducer to mitigate or obviate the aforementioned problems of the conventional ultrasonic transducer.

SUMMARY OF THE INVENTION

The main objective of the present invention is to provide an anti-EMI ultrasonic transducer.

The anti-EMI ultrasonic transducer has a conductive casing, a piezoelectric ceramic board having an opening, a conductive shelter, a first and second wires and an encapsulation. A first electrode face of the piezoelectric ceramic board faces to the opening and a second electrode face is mounted inside the conductive casing. The conductive shelter is mounted inside the conductive casing or covered to the opening, so the piezoelectric ceramic board is encapsulated in the conductive shelter and the conductive casing. Since the second signal wire is connected to the conductive shelter mounted inside the conductive casing, the conductive shelter and the conductive casing and the second electrode face of the piezoelectric ceramic board are commonly electronically connected to a voltage signal transmitted by the second signal wire. Therefore, the conductive shelter and the conductive casing are constituted to an EMI shelter for the piezoelectric ceramic board to resist external EMI signal.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
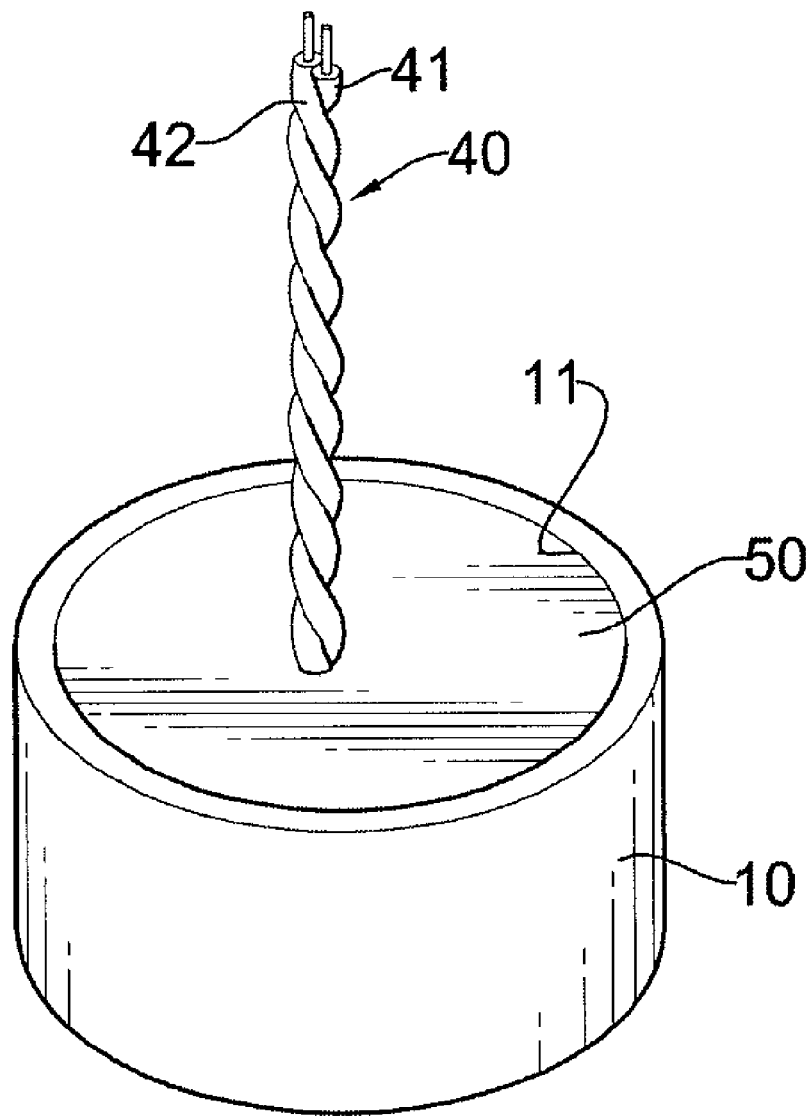
FIG. 1 is a perspective view of a first embodiment of an ultrasonic transducer in accordance with the present invention.
Figure 2:
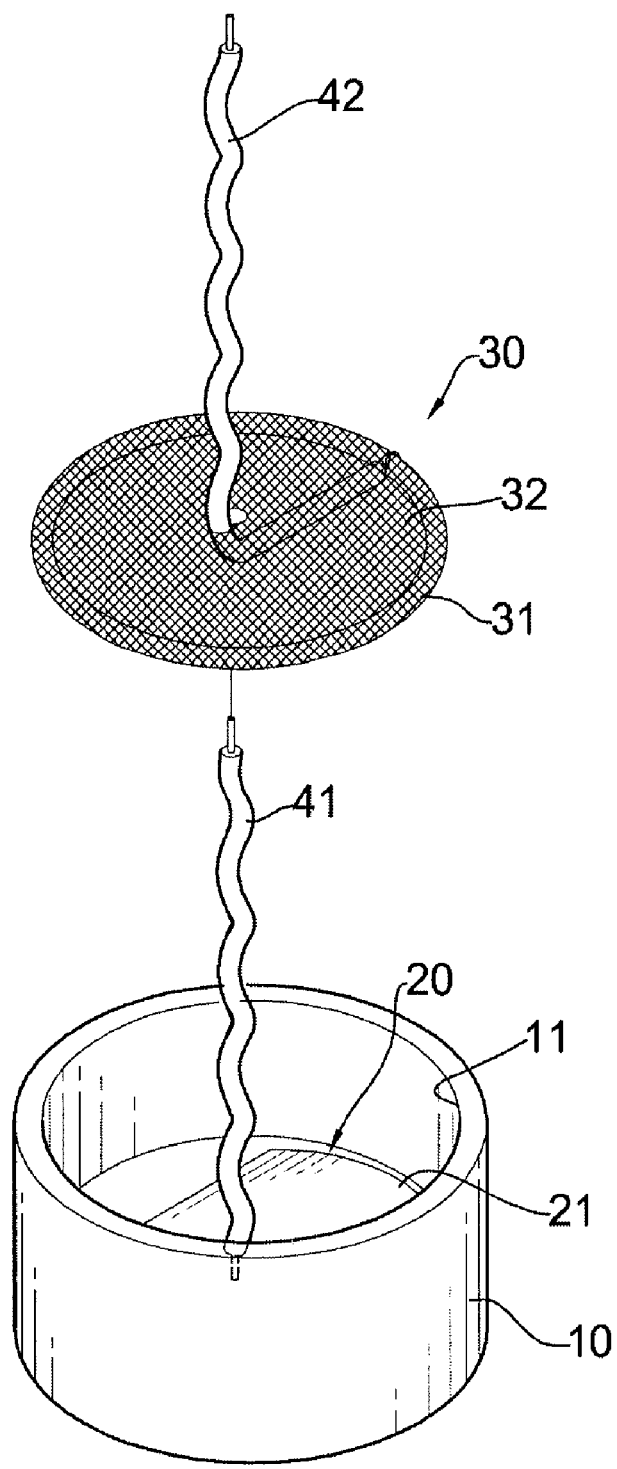
FIG. 2 is an exploded perspective view of the first embodiment of the ultrasonic transducer without an encapsulation.
Figure 3:
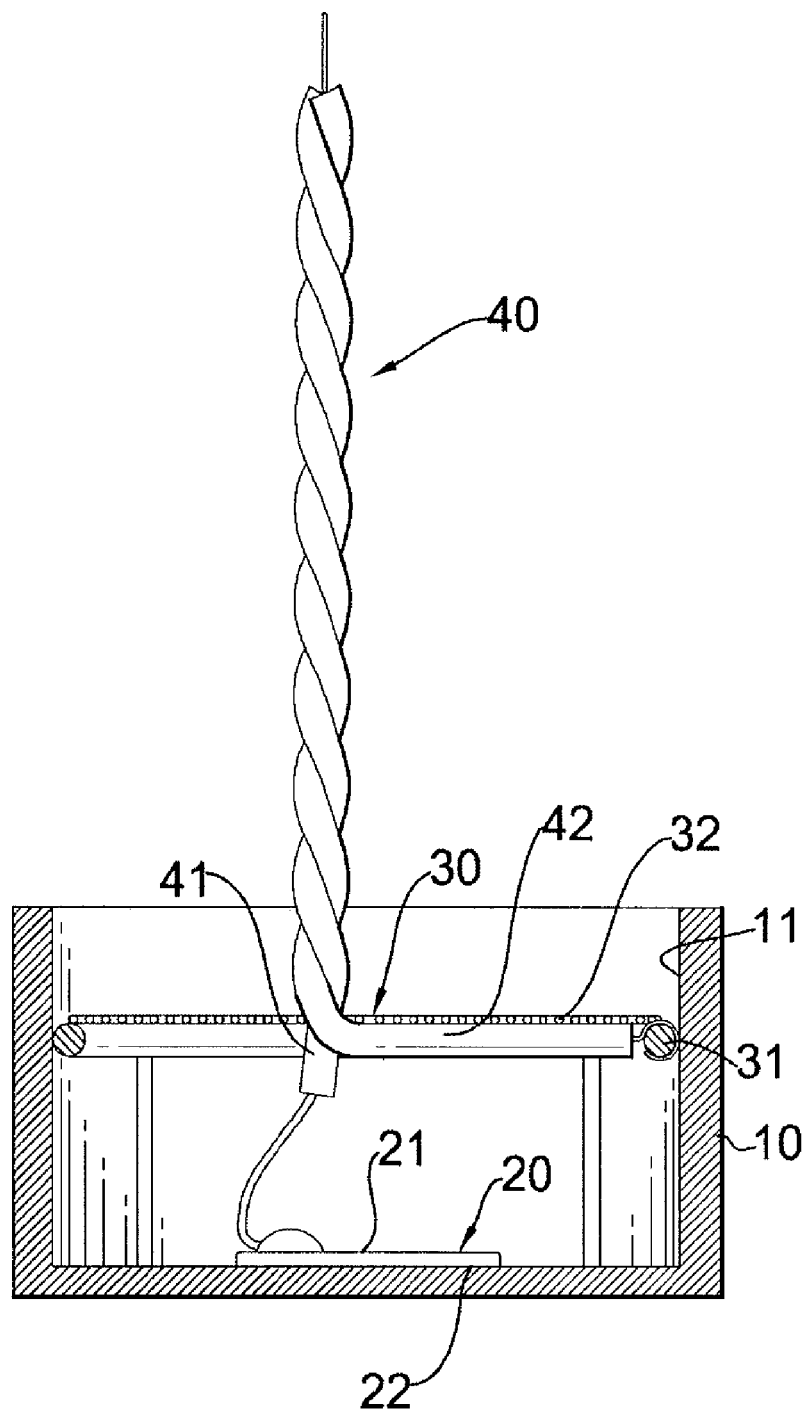
FIG. 3 is a cross sectional view in partial of the first embodiment of the ultrasonic transducer without the encapsulation.

With reference to FIGS. 1 to 4, a first embodiment of an ultrasonic transducer in accordance with the present invention has a conductive casing (10), a piezoelectric ceramic board (20), a conductive shelter (30) and multiple signal wires (40).

The conductive casing (10) has an inside face, inside wall and an opening (11) opposite to the inside face. The conductive casing (10) may be a hollow cylinder and the opening (11) is circular.

The piezoelectric ceramic board (20) is mounted inside the conductive casing (10) and has a first electrode face (21) and a second electrode face (22) being opposite to the first electrode face (21, 22). The second electrode face (22) is mounted on the inside face of the conductive casing (10). The first electrode face (21) faces to the opening (11). The first electrode face (21) is high potential electrode and the second electrode face is low potential electrode.

Figure 5:
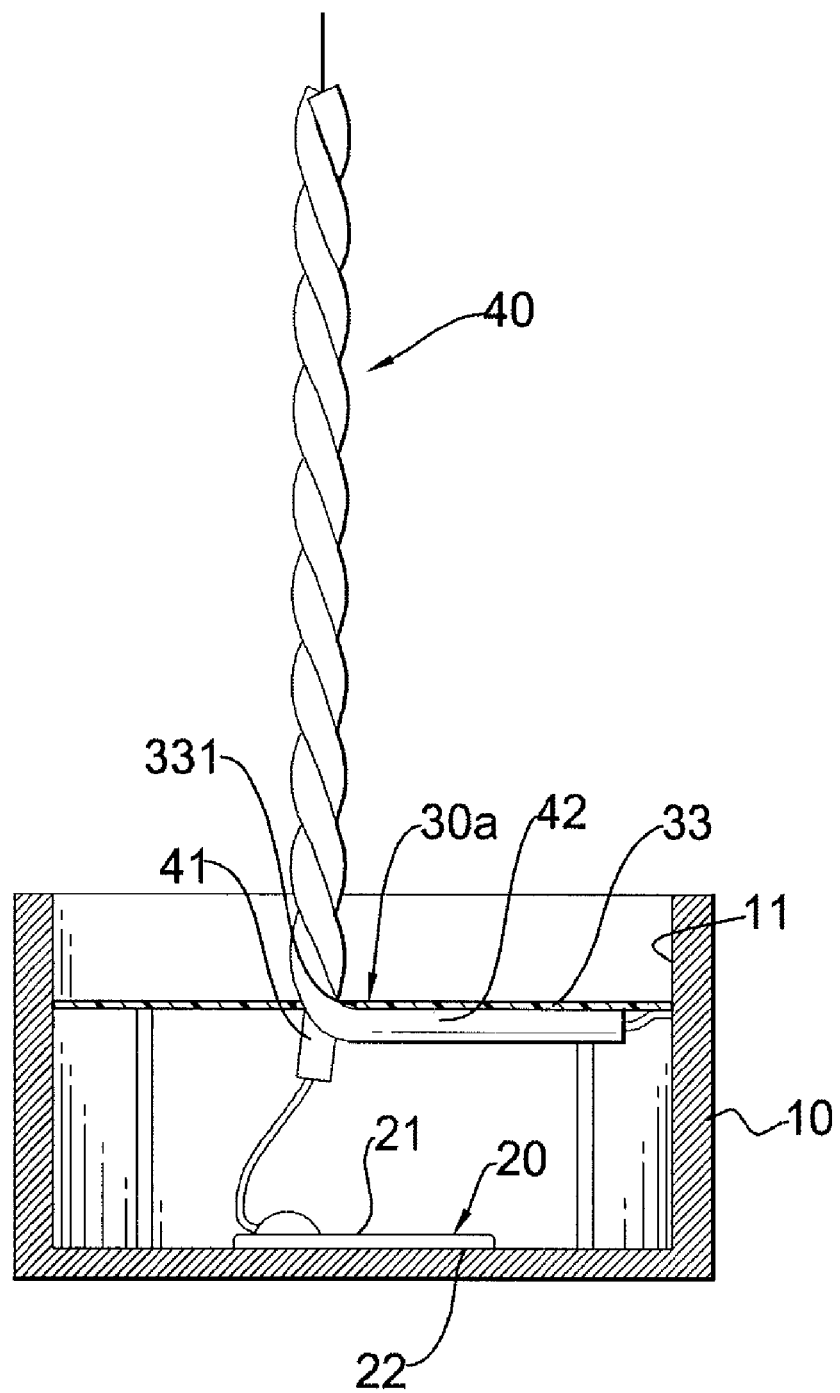
FIG. 5 is a cross sectional view in partial of a second embodiment of an ultrasonic transducer without the encapsulation.
Figure 6:
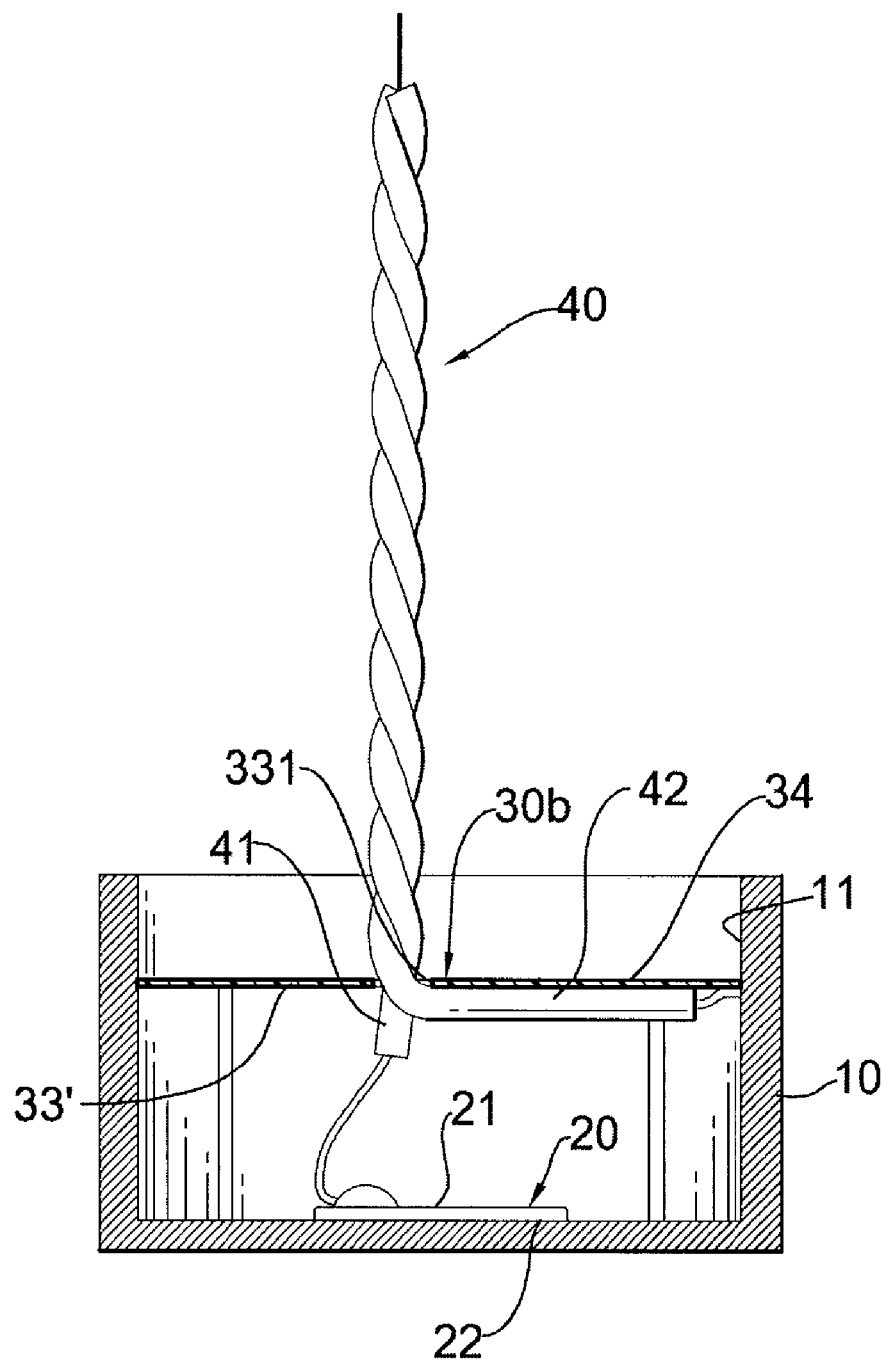
FIG. 6 is a cross sectional view in partial of a third embodiment of an ultrasonic transducer without the encapsulation.
Figure 7:
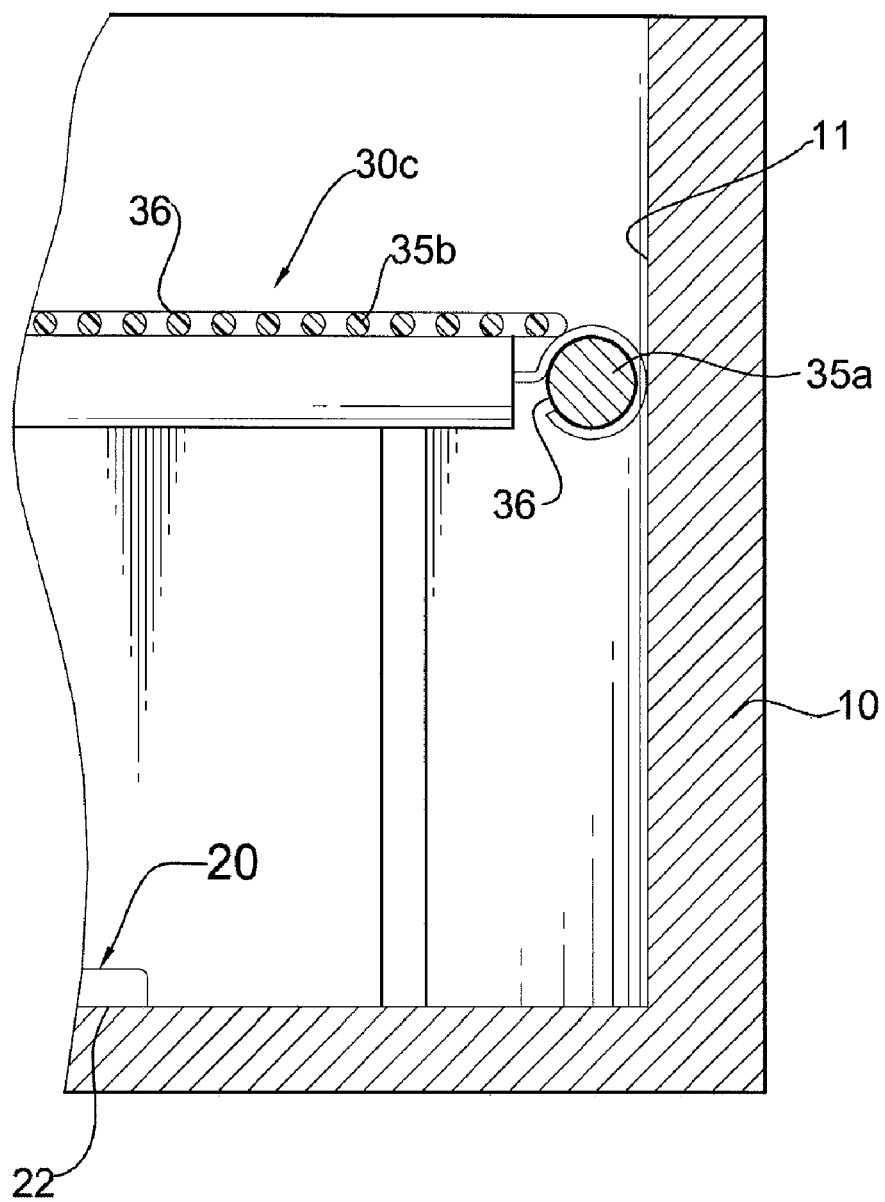
FIG. 7 is a cross sectional and enlarged view in partial of a fourth embodiment of an ultrasonic transducer without the encapsulation.
Figure 8:
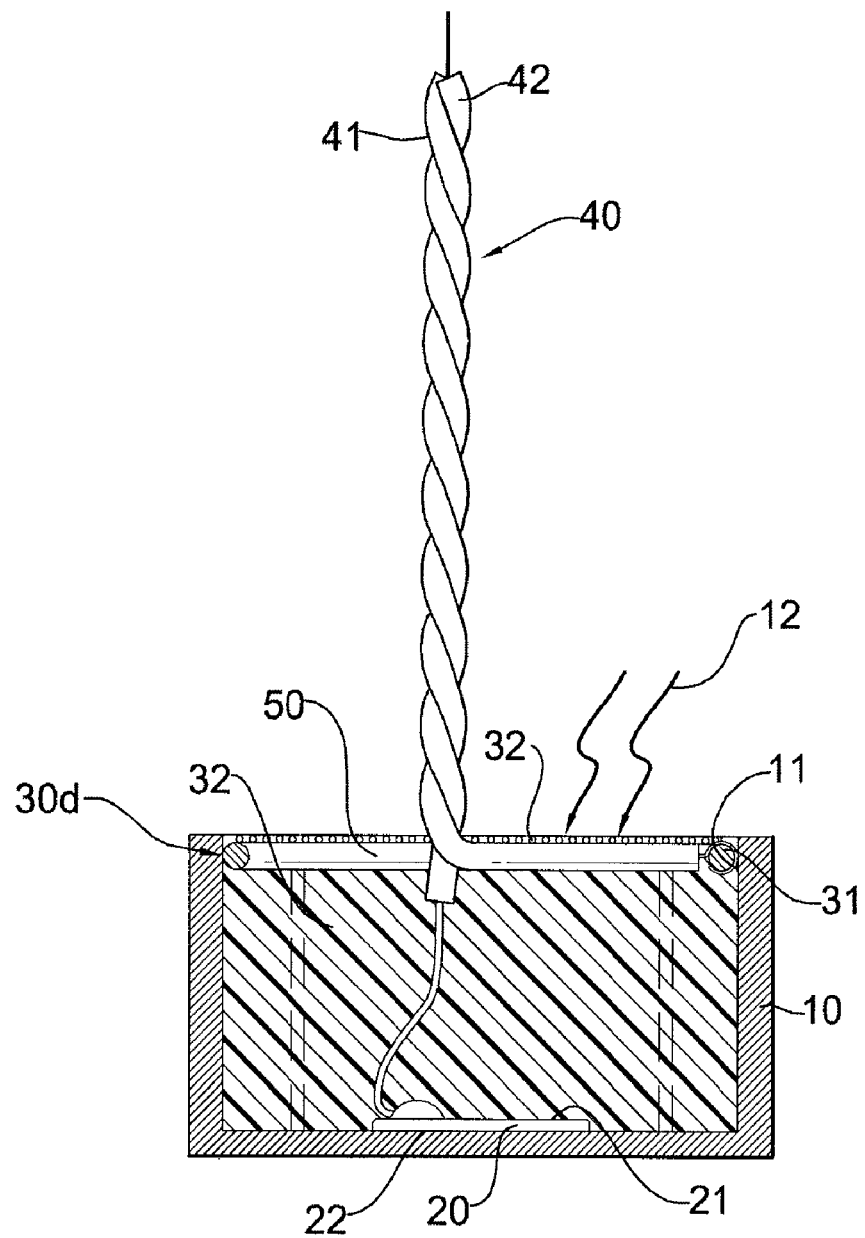
FIG. 8 is a cross sectional and enlarged view of a fifth embodiment of an ultrasonic transducer in accordance with the present invention.
Figure 9:
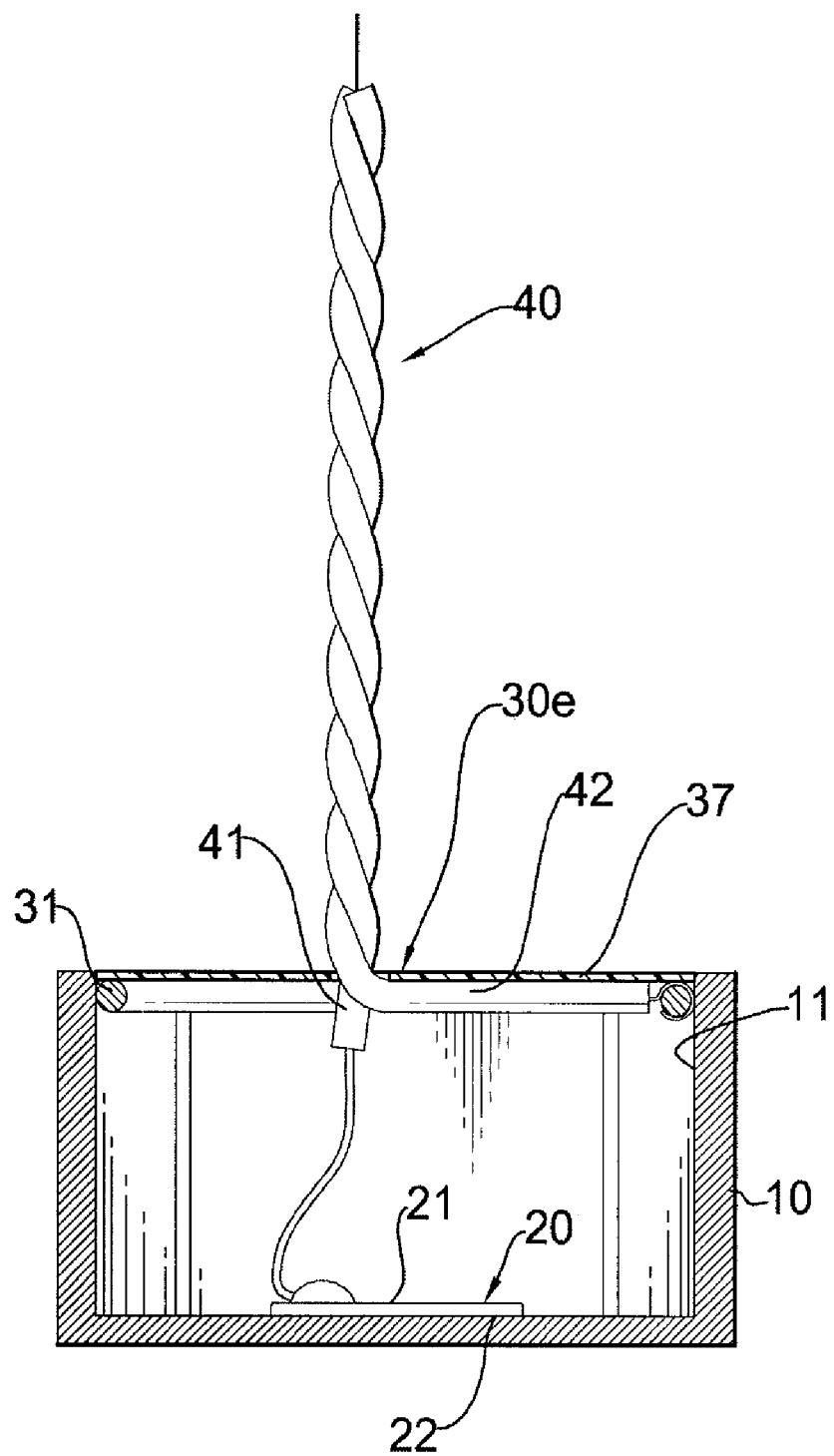
FIG. 9 is a cross sectional and enlarged view of a sixth embodiment of an ultrasonic transducer with the encapsulation.
Figure 10:
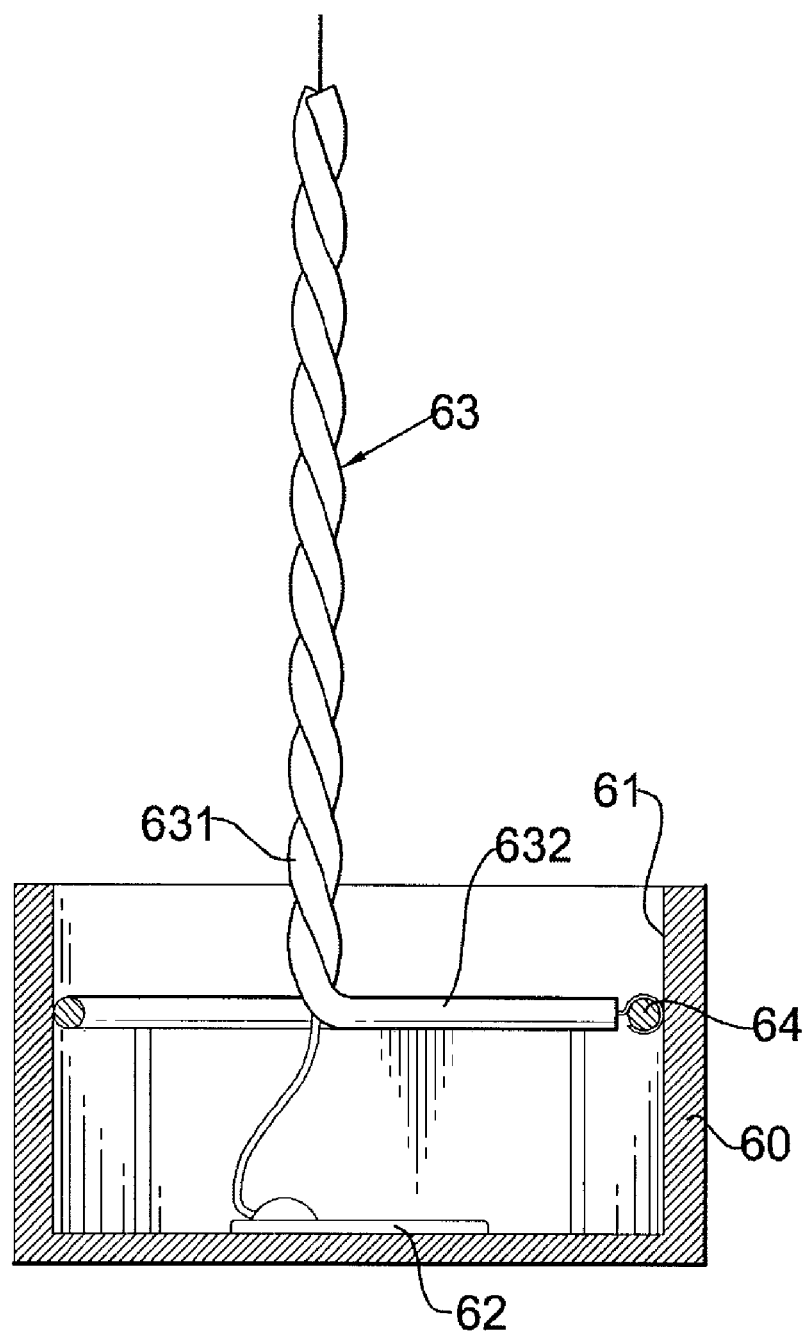
FIG. 10 is a cross sectional view in partial of a conventional ultrasonic transducer without an encapsulation in accordance with the prior art.
Figure 11:
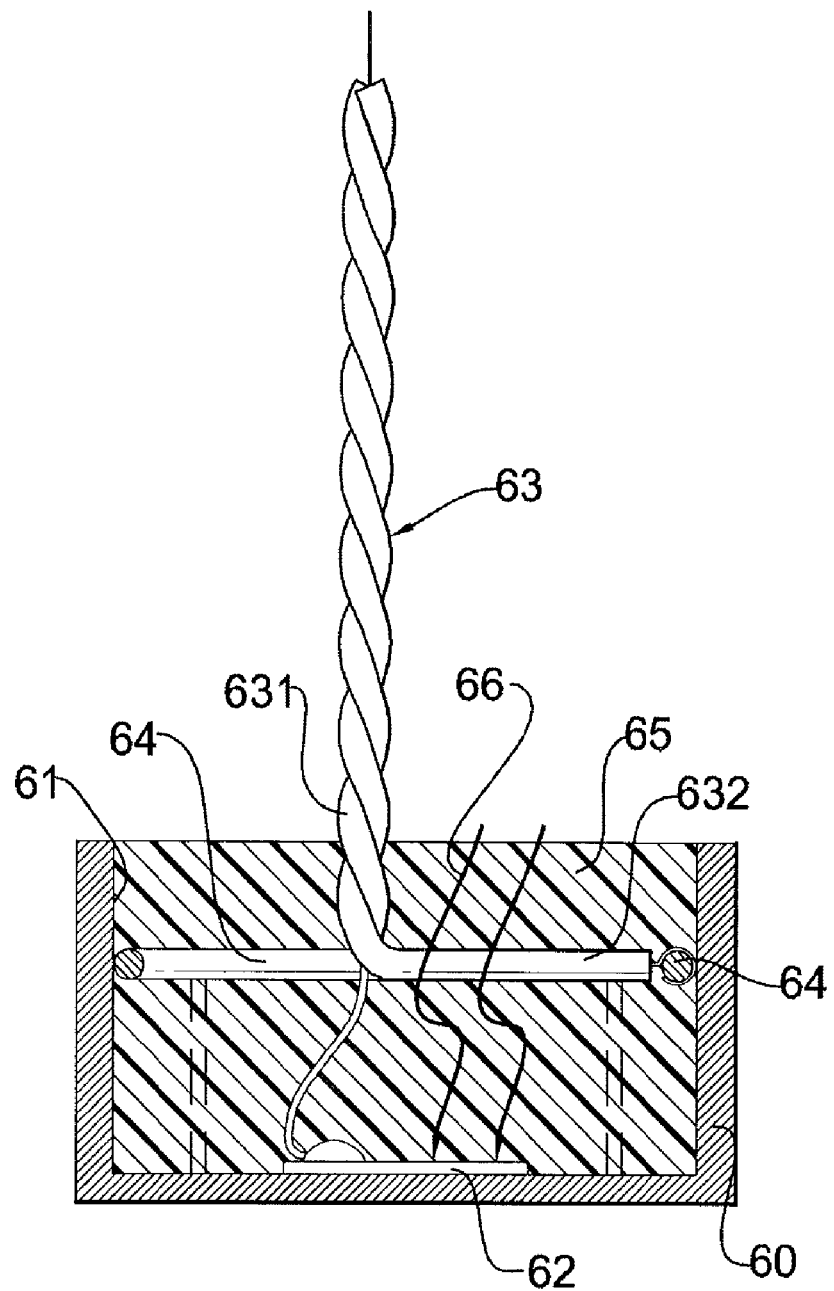
FIG. 11 is a cross sectional view of the conventional ultrasonic transducer without an encapsulation in accordance with the prior art.

The conductive shelter (30) is mounted to the conductive casing (10) to contain the piezoelectric ceramic board (20) therein, so an EMI shelter is consisted for the piezoelectric ceramic board (20). In the first embodiment, the conductive shelter (30) is mounted to the inside wall of the conductive casing (10) and located between the opening (11) and the piezoelectric ceramic board (20). The conductive shelter (30) has a ring (31) and a circular net (32). The ring (31) is connected to an edge of the circular net (32) and mounted to the inside wall of the conductive casing (10). With further reference to FIG. 5, in a second embodiment of the present invention, a conductive shelter (30a) is a circular board (33) having through holes (331). With reference to FIG. 6, in a third embodiment of the present invention, a conductive shelter (30b) is an electronic insulation board (33') coated and a metal coating layer (34) coated an outer surface of the electronic insulation board (33'). With reference to FIG. 7, in a fourth embodiment of the present invention, a conductive shelter (30c) has an electronic insulation ring (35a) and net (35b) and a metal coating layer (36) formed on outer surfaces of the electronic insulation ring (35a) and net (35b). With reference to FIG. 8, in a fifth embodiment of the present invention, a conductive shelter (30d) is covered on the opening (11) to constitute to an EMI shelter for the piezoelectric ceramic board (20). The conductive shelter (30) has a metal net (32) and a ring (31) mounted around an edge of the metal net (32). With reference to FIG. 9, in a sixth embodiment of the present, a conductive shelter (30e) has a ring (31) and a metal board (37). The ring (31) is mounted to the inside wall of the conductive casing (10) and the metal board (37) is mounted on the ring (31) to cover the opening (11).

The signal wires (40) has a first signal wire (41) and a second signal wire (42). The first signal wire (41) electronically insulates to and passes through the conductive shelter (30) and then mounted to the first electrode face (21). One end of the second signal wire (42) is connected to the conductive shelter (30). That is, in the first embodiment, the end of the second signal wire (42) passes through the metal net (32) and then soldered to the metal ring (31) of the conductive shelter (30). The first signal wire (41) is used to transmit a high potential signal and the second signal wire (42) is used to transmit a low potential signal. The first and second signal wires (41, 42) are constituted to a dual-twisted wire.

The encapsulation (50) is formed in the conductive casing (10) and seals the first and second signal wires (41, 42) in the conductive casing (10), the conductive shelter (30) and the piezoelectric ceramic board (20).

Since the conductive shelter (30) is mounted to the inside wall of the conductive casing (10) or covered on the opening (11), the conductive shelter (30) is located between the piezoelectric ceramic board (20) and the opening (11). Further, the second electrode face (22), the conductive casing (10), the conductive shelter (30) are electronically connected to the second signal wire (42), so the low potential signal is electronically connected to them. Therefore, when the conductive casing (10) and the conductive shelter (30) are electronically connected to the low potential signal, the EMI shelter of the piezoelectric ceramic board (20) is constituted.

Figure 4:
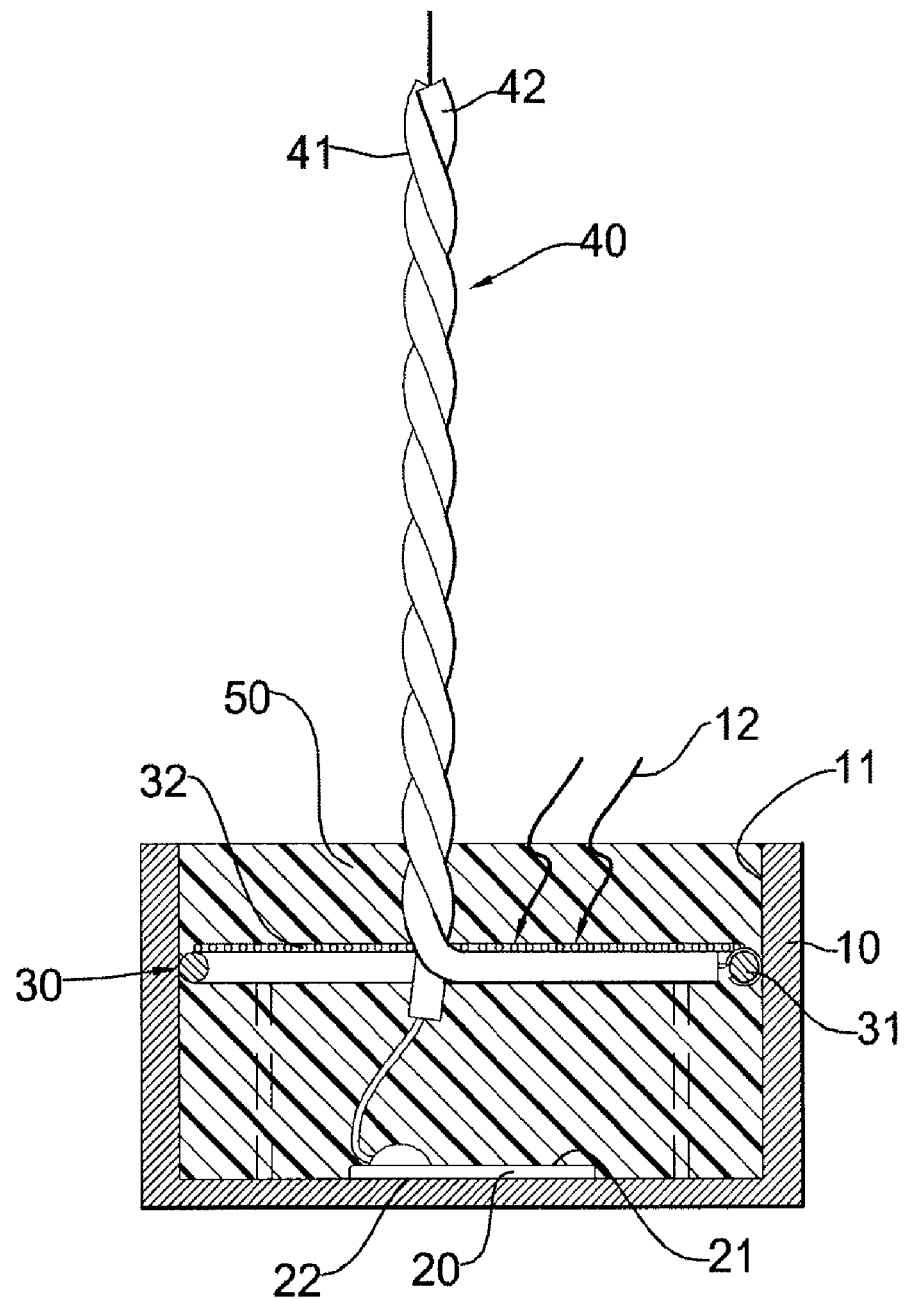
FIG. 4 is a cross sectional view of the first embodiment of the ultrasonic transducer without the encapsulation.

With reference to FIG. 4, when the EMI shelter of the piezoelectric ceramic board (20) is consisted, the external EMI signal is resisted outside the EMI shelter. That is, EMI signals (12) entering from the opening (11) is resisted by the conductive shelter (30). Therefore, the piezoelectric ceramic board (20) is not interfered by the external EMI signals (12) and generates detecting voltage without EMI noise.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An anti-EMI ultrasonic transducer comprising:
    a conductive casing having an inside face, inside wall and an opening opposite to the inside face;
    a piezoelectric ceramic board mounted on the inside face and having:
        a first electrode face; and
        a second electrode face being opposite to the first electrode face and mounted on the inside face of the conductive casing;
    a conductive shelter mounted to the conductive casing to form an EMI shelter for the piezoelectric ceramic board, and comprising:
        a circular and electronic insulation net having an edge;
        a circular and electronic insulation ring mounted around the edge of the circular and electronic insulation net; and
        a metal coating layer formed on an outer surface of the circular and electronic insulation net and ring;
    multiple signal wires having:
        a first signal wire electronically insulating to and passing through the conductive shelter and mounted to the first electrode face of the piezoelectric ceramic board, and configured to transmit a first voltage signal with a first potential; and
        a second signal wire connected to the conductive shelter, and configured to transmit a second voltage signal with a second potential which is lower than the first potential of the first voltage signal; and
    an encapsulation formed in the conductive casing and sealing the first and second signal wires in the conductive casing, the conductive shelter and the piezoelectric ceramic board.

2. The anti-EMI ultrasonic transducer as claimed in claim 1, wherein the conductive shelter is mounted to the inside wall of the conductive casing and located between the opening and the piezoelectric ceramic board.

3. The anti-EMI ultrasonic transducer as claimed in claim 1, wherein the conductive shelter covers the opening.

4. The anti-EMI ultrasonic transducer as claimed in claim 1, wherein the conductive casing is a hollow cylinder.

5. The anti-EMI ultrasonic transducer as claimed in claim 2, wherein the conductive casing is a hollow cylinder.

6. The anti-EMI ultrasonic transducer as claimed in claim 3, wherein the conductive casing is a hollow cylinder.

7. The anti-EMI ultrasonic transducer as claimed in claim 2, wherein the first and second signal wires are made of a dual-twisted wire.

8. The anti-EMI ultrasonic transducer as claimed in claim 3, wherein the first and second signal wires are made of a dual-twisted wire.

9. An anti-EMI ultrasonic transducer comprising:
  a conductive casing having an inside face, inside wall and an opening opposite to the inside face;
  a piezoelectric ceramic board mounted on the inside face and having:
    a first electrode face; and
    a second electrode face being opposite to the first electrode face and mounted on the inside face of the conductive casing;
  a conductive shelter mounted to the conductive casing to form an EMI shelter for the piezoelectric ceramic board, the conductive shelter comprising:
    a circular net having an edge; and
    a ring mounted around the edge of the circular net;
  multiple signal wires having:
    a first signal wire electronically insulating to and passing through the conductive shelter and mounted to the first electrode face of the piezoelectric ceramic board, and configured to transmit a first voltage signal with a first potential; and
    a second signal wire connected to the conductive shelter and electronically insulated and passed through the circular net of the conductive shelter, and configured to transmit a second voltage signal with a second potential which is lower than the first potential of the first voltage signal; and
  an encapsulation formed in the conductive casing and sealing the first and second signal wires in the conductive casing, the conductive shelter and the piezoelectric ceramic board.

10. The anti-EMI ultrasonic transducer as claimed in claim 9, wherein the conductive shelter is mounted to the inside wall of the conductive casing and located between the opening and the piezoelectric ceramic board.

11. The anti-EMI ultrasonic transducer as claimed in claim 9, wherein the conductive shelter covers the opening.

12. The anti-EMI ultrasonic transducer as claimed in claim 9, wherein the conductive casing is a hollow cylinder.

13. The anti-EMI ultrasonic transducer as claimed in claim 10, wherein the conductive casing is a hollow cylinder.

14. The anti-EMI ultrasonic transducer as claimed in claim 11, wherein the conductive casing is a hollow cylinder.

15. The anti-EMI ultrasonic transducer as claimed in claim 10, wherein the first and second signal wires are made of a dual-twisted wire.

16. The anti-EMI ultrasonic transducer as claimed in claim 11, wherein the first and second signal wires are made of a dual-twisted wire.

* * * * *